United States Patent [19]
Vannel

[11] Patent Number: 6,058,483
[45] Date of Patent: May 2, 2000

[54] METHOD FOR SECURE TRANSFER OF DATA BY A COMMUNICATION NETWORK

[75] Inventor: Pierre Vannel, Saint Bonnet, France

[73] Assignee: Gemplus S. C. A., Gemenos, France

[21] Appl. No.: 09/125,664

[22] PCT Filed: Dec. 23, 1997

[86] PCT No.: PCT/FR97/02414

§ 371 Date: Sep. 14, 1998

§ 102(e) Date: Sep. 14, 1998

[87] PCT Pub. No.: WO98/28719

PCT Pub. Date: Jul. 2, 1998

[30] Foreign Application Priority Data

Dec. 24, 1996 [FR] France ................. 96/15980

[51] Int. Cl.[7] .............. G06F 17/60; H04L 9/00; H04K 1/00
[52] U.S. Cl. .......................... 713/201; 713/176
[58] Field of Search .................... 713/200, 201, 713/175, 176, 178, 180

[56] References Cited

U.S. PATENT DOCUMENTS

| | | | |
|---|---|---|---|
| 5,390,247 | 2/1995 | Fischer | 380/25 |
| 5,479,509 | 12/1995 | Ugon | 380/23 |
| 5,623,637 | 4/1997 | Jones et al. | 395/491 |
| 5,649,118 | 7/1997 | Carlisle et al. | 395/241 |
| 5,696,827 | 12/1997 | Brands | 380/30 |
| 5,812,398 | 9/1998 | Nielson | 364/285.1 |
| 5,996,113 | 11/1999 | Korn et al. | 714/807 |
| 6,012,049 | 1/2000 | Kawan | 705/41 |

FOREIGN PATENT DOCUMENTS

| | | |
|---|---|---|
| 0700023 | 3/1996 | European Pat. Off. . |
| 4439266 | 4/1996 | Germany . |
| 9308545 | 4/1993 | WIPO . |

*Primary Examiner*—Joseph E. Palys
*Assistant Examiner*—Ronald D Hartman, Jr.
*Attorney, Agent, or Firm*—Roland Plottel

[57] ABSTRACT

The invention concerns data transfer carried out by a communication network. It concerns in particular a method for safe data transfer by a communication network, between a first entity consisting of a chip card and a second entity, which consists in the preliminary production of an electronic signature for proving the initialisation of the transfer, this signature being stored in at least a memory zone of the chip card, then, when the data transfer is completed, in erasing this signature. The invention is applicable to electronic purses.

11 Claims, 6 Drawing Sheets

FIG_ 4A

METHOD FOR SECURE TRANSFER OF DATA BY A COMMUNICATION NETWORK

The invention concerns data transfers carried out by a communication network. This network may for example be the switched telephone network, a cellular communication network such as the network to the G.S.M. European standard or the INTERNET network.

In cases of conventional exchanges of data between two entities, the authenticity of these exchanged data is guaranteed by an electronic signature. This electronic signature may be obtained using various cryptographic mechanisms such as ciphering or authentification mechanisms or mechanisms involving signatures in the proper sense. The corresponding calculation algorithm may be symmetric, in which case the secret signature key is shared by the two entities, or asymmetric, in which case the secret signature key is known only by the signing entity. Such data transfer methods, allowing the authentification of exchanged data, are notably described in patent application EP-A-0 683 582 and in patent application U.S. Pat. No. 5,534,683.

Today, we are witnessing a great development of mass-market applications on communication networks capable of allowing the use of chip cards. However, the operation of transferring data by a network is difficult to implement since it may consist of exchanges between a number of entities and a chip card. Moreover, data exchanges by means of a network may be interrupted for many reasons such as, for example, a break in a communication, pulling out of the chip card or a failure of the entity exchanging data with the chip card. This interruption brings about a desynchronization of the two entities to the detriment of one of them. The mechanisms known to date do not allow this desynchronization problem to be avoided in the event of interruption during a data transfer.

The present invention makes it possible to solve this problem of desynchronization of two entities liable to occur at the time of an interruption and proposes a method for secure transfer of data by a communication network, between a first entity constituted by a chip card and a second entity, capable of guaranteeing the use of the chip card under all circumstances even in the event of interruptions during transactions. This method consists of first producing an electronic signature, making it possible to prove the initiation of the transfer, and of storing it in at least one memory area of the chip card and then, when the transfer is complete, of erasing this signature.

According to another characteristic of the invention, the method includes a claim procedure, this procedure consisting of checking the presence or absence of the signature in a memory area of the chip card, in order to know whether the data transfer has failed or succeeded.

According to another characteristic of the invention, when the data transfer has been interrupted, the claim procedure furthermore consists of:

producing a new electronic signature, replacing the signature of the failed transfer by the said new signature, performing the steps of the transfer not yet executed, and then erasing the new signature when the transfer is complete.

According to another characteristic of the invention, the signature is stored securely in a memory area so that it is not accessible to the outside world either for reading nor writing.

Advantageously, this memory area is an area of electrically programmable memory of EEPROM type.

According to another characteristic of the invention, the signature is produced by the second entity and erased by the chip card electronics.

According to another characteristic of the invention, the signature may be produced by means of a cryptographic algorithm.

According to another characteristic of the invention, the transferred data are value units. In this case, the chip card may be an electronic purse.

According to another characteristic of the invention, the data transfer method may be applied to a financial transaction between a banking institution and an electronic purse in order to credit the content of the purse, or between a service provider and an electronic purse in order to debit the content of the purse.

According to another characteristic of the invention, the data transfer method may be applied to a transaction of value units between a gaming organisation and a chip card.

The present invention makes it possible to avoid possible unbalances, capable of being created between two entities, caused by interruptions during data transfers. This is because the presence of the electronic signature in a memory area of the chip card, after a transfer operation, indicates the existence of a unbalance and constitutes proof that the operation has failed. Restoration of balance in the exchanges is carried out at the initiative of the user of the chip card. Moreover, an electronic signature corresponding to a transfer can be used only once.

Other particularities and advantages of the invention will emerge from a reading of the description given by way of a non-limitative example with reference to the accompanying figures which depict:

FIG. 1, a schematic diagram of a device for implementing a method according to the invention, FIG. 2, a flow diagram of a data transfer method according to the invention, FIG. 3, a flow diagram of a claim procedure making it possible to execute the steps of the transfer method which were interrupted, FIG. 4A, a flow diagram of a transfer method applied to a financial transaction, between a banking institution and an electronic purse, FIG. 4B, a flow diagram of a claim procedure allowing the execution of steps which were interrupted during the transaction of FIG. 4A, FIG. 5A, a flow diagram of a transfer method applied to a financial transaction between an electronic purse and a service provider, FIG. 5B, a flow diagram of a claim procedure allowing the execution of steps which were interrupted during the transaction of FIG. 5A.

The data transfer method according to the invention is carried out between two entities, one of which is preferably a chip card.

The chip card used comprises in a known manner a microprocessor connected by a bus to the different memories and to the input/output ports of the card. Among the memories, there is generally:

a volatile RAM working memory, as in all microprocessor-based systems, for storing the intermediate data necessary during use of the card, a ROM read-only memory, containing system programs allowing operation of the card, programs which do not vary from one use to another of the card, an EEPROM electrically programmable and erasable memory, for recording data intended to be modified and updated during successive uses of the card.

Figure 1:
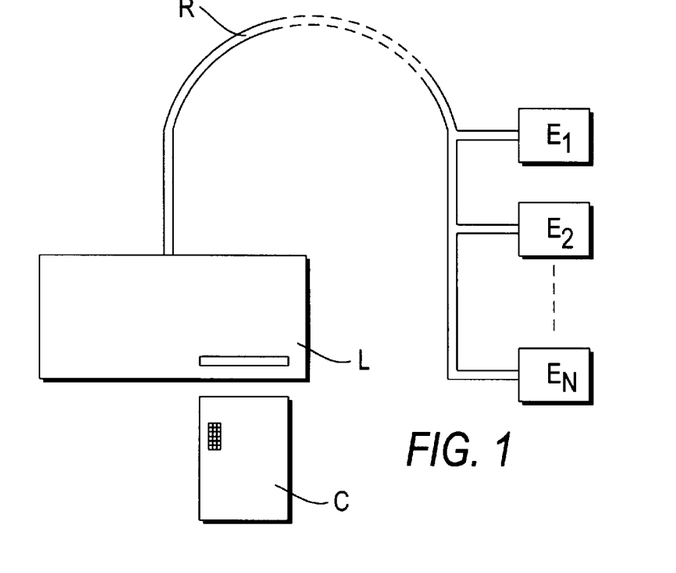

FIG. 1 illustrates a schematic diagram of a device for implementing a data transfer method according to the invention. A chip card C is inserted into the slot of a read/record device referred to subsequently as reader L, which may for example be a computer. The reader L is connected, by means of a network R, to a number of entities E1, E2, . . . EN capable of exchanging data with the chip card C.

Figure 2:
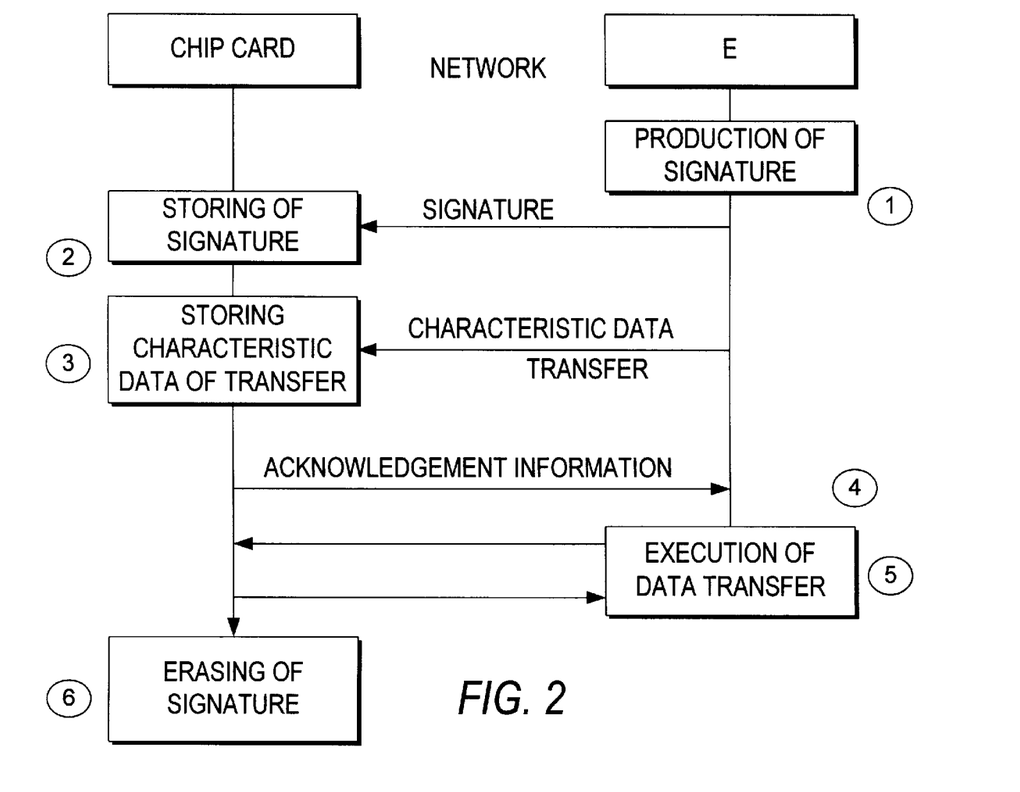

The flow diagram of FIG. 2 illustrates the different steps of a data transfer method according to the invention, between a first entity such as a chip card and a second entity E, by means of a network. In a first step 1, the entity E produces an electronic signature to indicate the initiation of the transfer. The entity then orders the writing of this signature into at least one memory area of the chip card, at step 2. This electronic signature is recorded securely in this memory area, that is to say it is stored so that it is not accessible either for reading nor writing by the outside world. Preferably the memory area in which it is stored is an area of electrically programmable memory of EEPROM type.

The entity E may also have cryptographic algorithms so as to ensure the confidentiality of the signature.

The following steps 3, 4 and 5 consist of performing the data transfer. For this, the entity orders the writing, into another area of the chip card EEPROM memory, of characteristic data of the transfer (step 3). The chip card then sends back acknowledgement information according to which it authorizes the transfer (step 4), and then the transfer is executed (step 5). When the data transfer is complete, the chip card microprocessor orders the erasing of the signature stored in memory (step 5).

If an interruption of the transfer, due to a break in communication, premature pulling out of the chip card or a failure of the entity E for example, occurs between steps 4 and 5, a unbalance might well be created to the detriment of one of the two entities. By virtue of the method according to the invention, such a unbalance can be revealed by the presence of the signature which will not have been erased from the chip card memory. The presence of this signature therefore indicates a possible error situation. Restoration of balance is then performed at the initiative of the user of the card by making a new connection between the two entities by means of the network.

Figure 3:
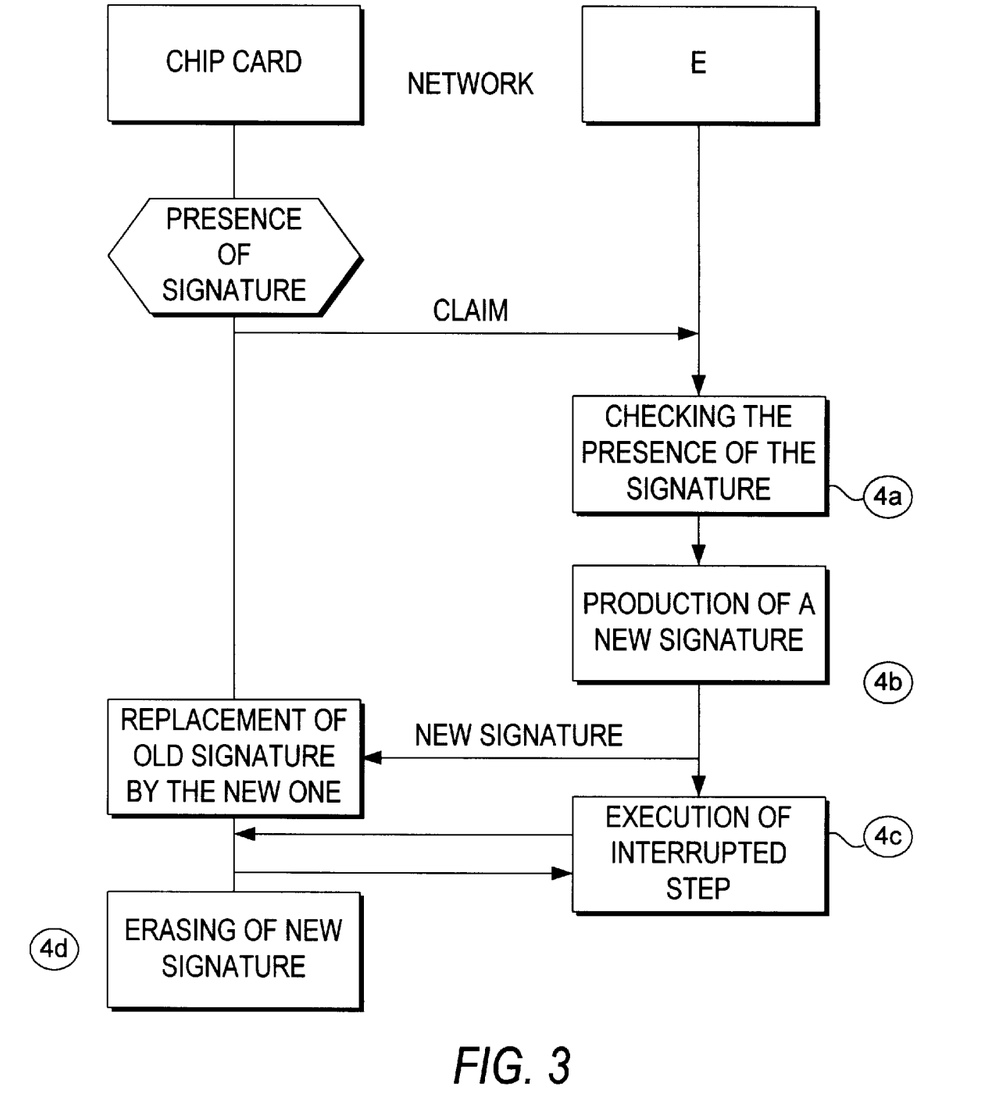

The chip card then orders the execution of a claim procedure, the flow diagram of which is depicted in FIG. 3.

First, at step 4a, the entity E checks the presence or absence of the signature in the chip card memory area reserved for it, so as to check whether the data transfer has failed or succeeded.

When the signature is present, that is to say when the transfer has failed, the entity E then produces a new electronic signature and orders the replacement of the first signature corresponding to the failed transfer by this new signature, at step 4b.

The method used, in order to update this signature securely, may for example be the one described in patent application FR 95 01791.

The following step 4c consists of executing the data transfer steps which were interrupted. Finally, when the data transfer has been completely and correctly executed, the new signature is erased (step 4d).

The transferred data may notably be value units.

Advantageously, the chip card may be implemented in electronic purse form.

A particular application of the method according to the invention concerns a financial transaction between an electronic purse (card C) and a banking institution (entity E1) or between an electronic purse and a service providing organisation (entity E2).

In this case, a value unit corresponds, advantageously, to a monetary unit.

A transaction between a purse and a banking institution consists more particularly of crediting the content of the purse, whereas a transaction between this purse and a service providing organisation consists of debiting it.

Management of the storing and erasing of the signature in the EEPROM memory of the electronic purse depends on the type of operation performed. This is because it is different depending on whether the operation consists of crediting or debiting the content of the electronic purse. This management is explained in more detail below.

Figure 4A:
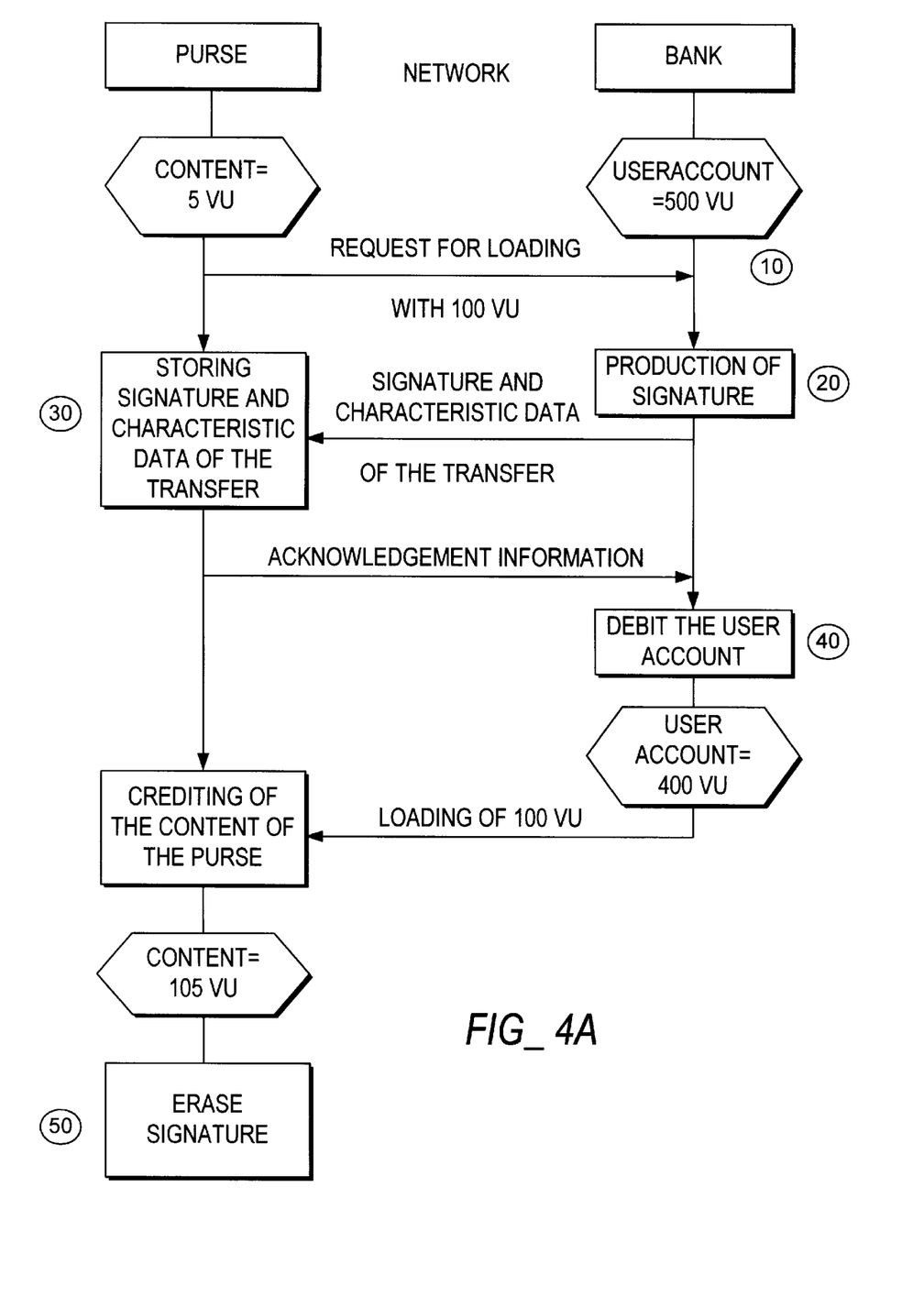

The flow diagram of FIG. 4A illustrates the loading of an electronic purse during a financial transaction with a banking institution.

In the example depicted in this figure, prior to initiation of the transaction, the content of the purse consists of 5 value units VU, and the bank account of the user of the purse consists of 500 VU.

When a user requests the loading of his purse with a value of 100 value units VU for example (step 10), the bank, after having checked the balance of the user account, produces a proof of the transaction, that is to say it calculates an electronic signature, and transmits it to the purse (step 20).

The purse stores the electronic signature and the characteristic data of the transaction in an area of EEPROM memory and sends back to the bank acknowledgement information authorizing execution of the transaction (step 30).

The bank then debits the user account and orders the corresponding loading of the purse (step 40). The crediting is carried out and, simultaneously, the purse erases the signature using the method for secure updating of EEPROM memory described in patent application FR 95 01791.

When the transaction operation is complete, the content of the electronic purse must consequently be equal to 105 VU, while the content of the bank account of the user of the purse is equal to 400 VU.

An interruption between steps 30 and 40 may bring about a unbalance between the purse and the bank to the detriment of the user. This is because it is possible that the bank account of the user has been debited while his purse has not been credited.

However, when such an interruption occurs, since the loading of the purse did not succeed, the signature is not erased from the purse EEPROM memory. The presence of this signature therefore makes it possible to prove that the transaction has failed. The user must then reconnect his purse to the banking institution, by means of the network, in order to restore balance.

Figure 4B:
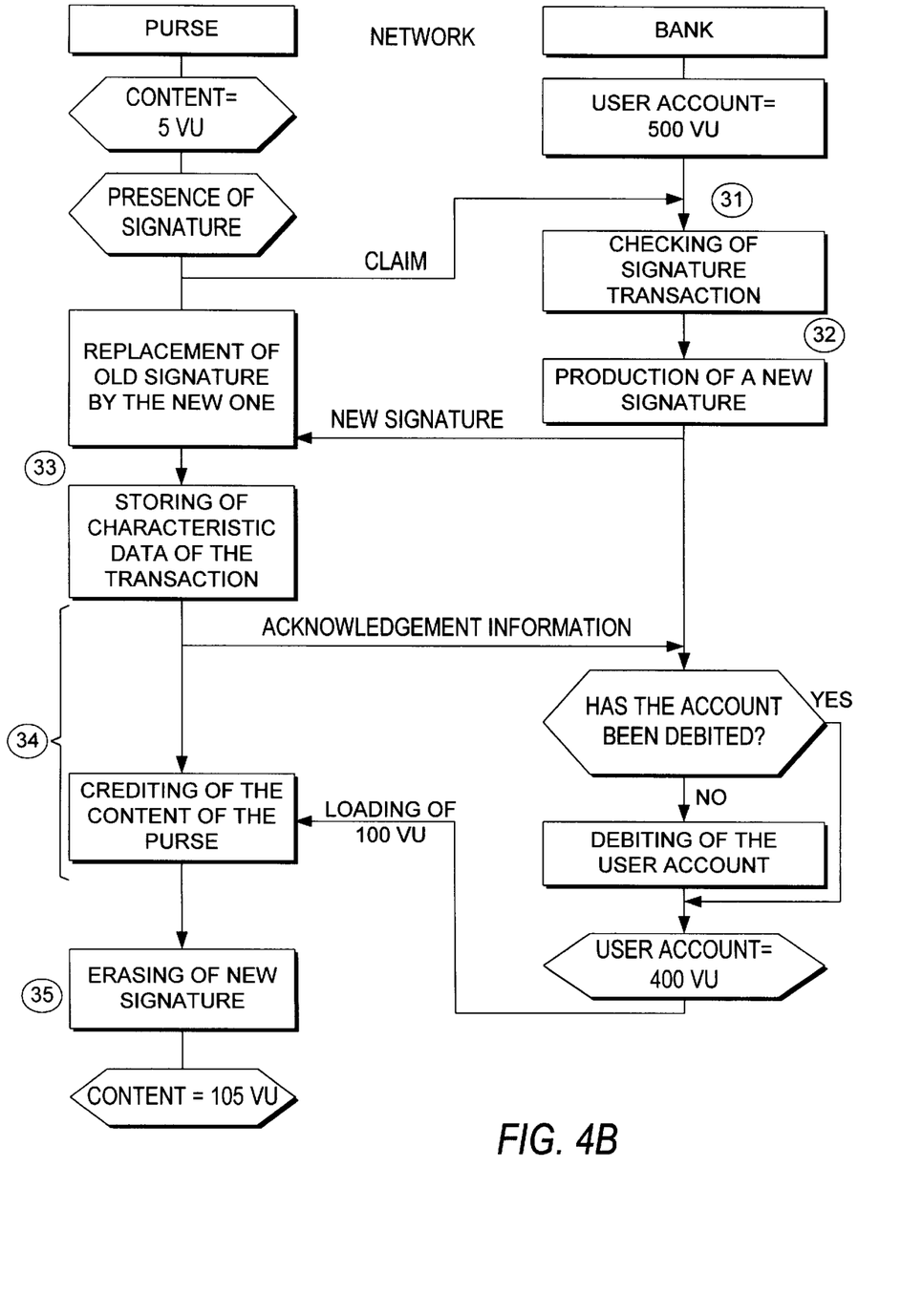

At the time of reconnection, the electronic purse microprocessor starts the execution of a claim procedure, the flow diagram of which is illustrated in FIG. 4B.

In the example of FIG. 4B, the bank account of the user has been debited by 100 VU and is equal to 400 VU, while the content of the purse has not been credited and is still equal to 5 VU.

At the time of the claim, the purse therefore presents to the bank the characteristic data of the transaction and the proof that this transaction was interrupted, that is to say the electronic signature (step 31). The bank checks this electronic signature and validates the claim procedure. Then it produces a new proof of the transaction and transmits it to the purse (step 32).

The purse then stores the new electronic signature, replacing the one corresponding to the failed credit operation, and the characteristic data of the new transaction, and then sends to the bank acknowledgement information authorizing the transaction (step 33). Replacement of the first electronic signature corresponding to the interrupted transaction by the new electronic signature is carried out by means of the method for secure updating of EEPROM memory described in patent application FR 95 01791.

If the bank account of the user was not debited at the time of the first transaction, the bank performs the debit and then, in all cases, orders the loading of the purse, at step 34.

In the example of FIG. 4B, the bank account was debited before interruption of the first transaction. In this case, the bank orders the loading of the content of the purse just after having received the acknowledgement information authorizing the transaction.

The purse erases the new signature of the transaction simultaneously with the credit operation (step 35).

In the same way, a financial transaction may take place between an electronic purse and a service provider. In this case, the service provider, in exchange for a service to be rendered, orders the debiting by a certain value of the content of the purse. This transaction between purse and service provider is depicted in FIG. 5A.

When a user requests a service (step 100), the service provider produces a proof of the order, that is to say an electronic signature corresponding to the transaction to be performed.

Figure 5A:
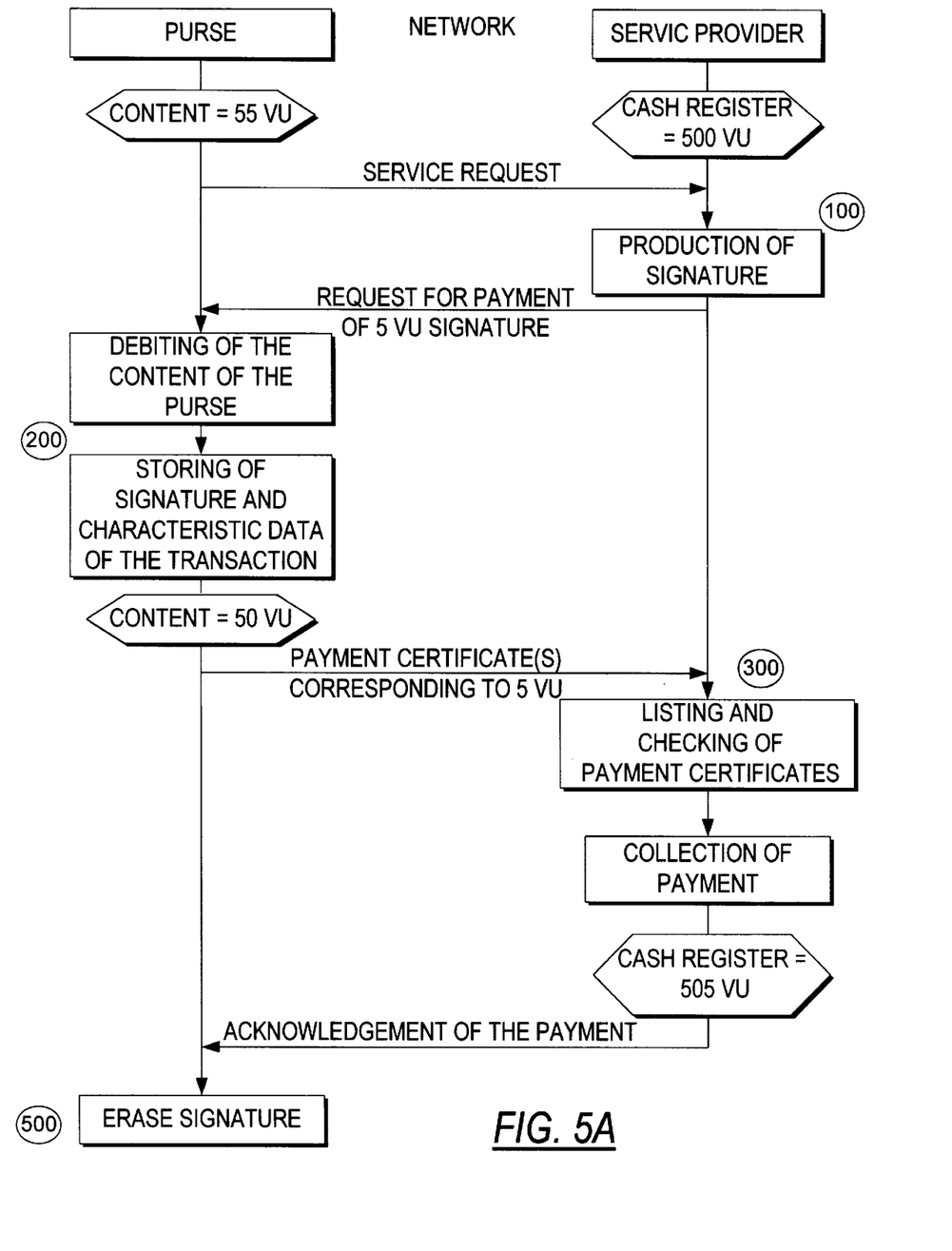

The purse is next debited by the value corresponding to the service, 5 VU in the example of FIG. 5A, and the signature and characteristic data of the transaction are simultaneously recorded in the EEPROM memory of the purse, at step 200.

The purse then issues debit certificates and transmits them to the provider (step 300). The provider checks these certificates, records them and acknowledges the payment (step 400). The payment having been acknowledged, the electronic signature corresponding to the order is erased from the EEPROM memory of the electronic purse (step 500).

If there is a break between steps 300 and 400, the presence of the signature in the EEPROM memory of the purse indicates a possible error situation. This error situation may for example result from the fact that the payment has not been collected by the provider whereas the content of the purse has been debited. However, as long as the provider is not paid, he does not provide the corresponding required service. In order to obtain the service for which he has paid, the user must consequently present the proof of the order, that is to say the electronic signature corresponding to the requested transaction, and possibly re-send the payment certificates if they have not been received by the provider.

Figure 5B:
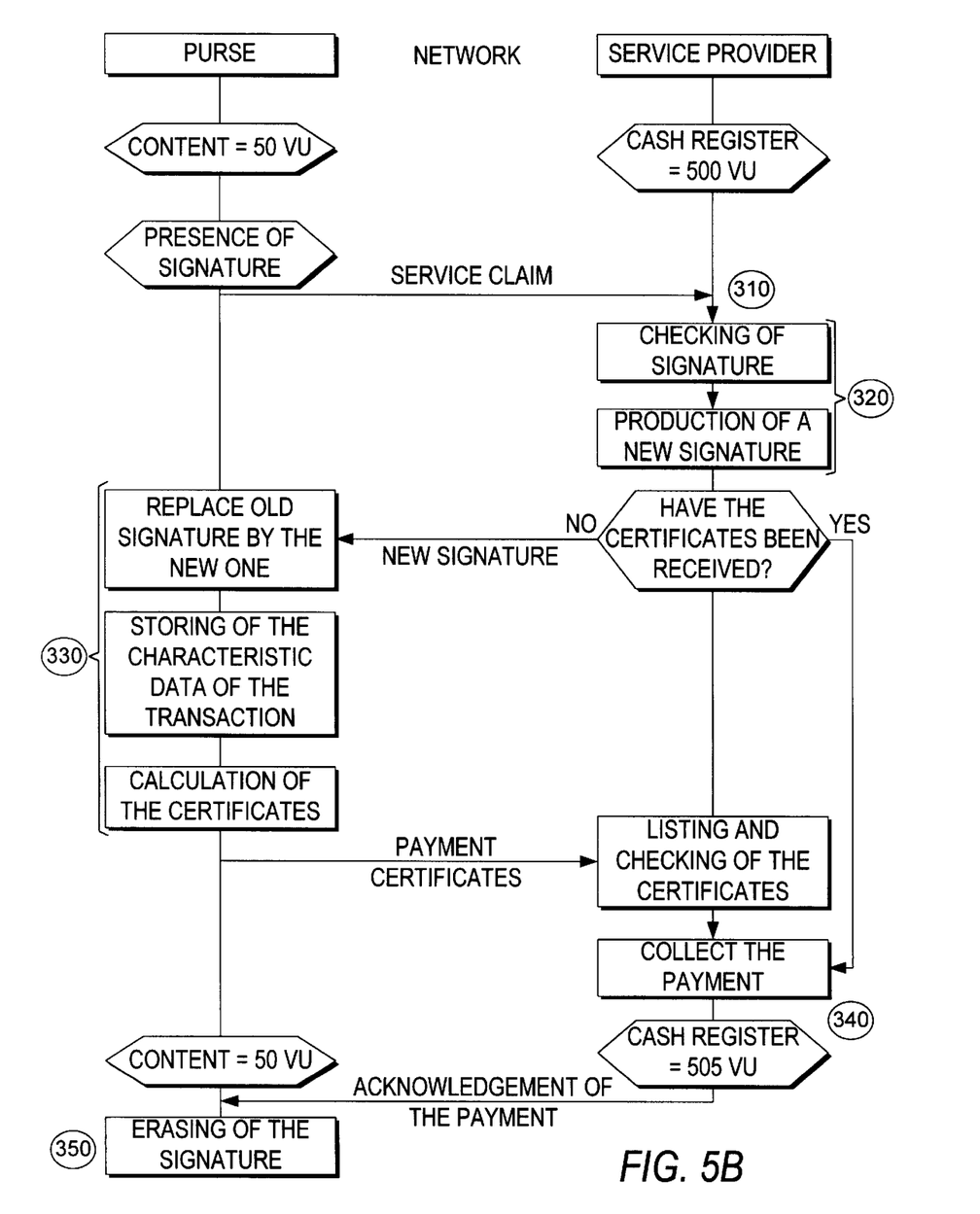

The flow diagram of FIG. 5B describes the execution of the claim procedure making it possible to complete the payment of a service provider.

In the example in this FIG. 5B, the content of the purse has been debited by 5 VU, at the time of the first transaction corresponding to FIG. 5A, whereas the payment has not been collected by the provider, the content of the cash register still being equal to 500 VU. The purse first transmits to the provider the claim information, that is to say the characteristic data of the failed transaction and the signature.

Where the certificate or certificates has or have been received by the provider, the latter acknowledges the payment and the proof of the transaction is erased (steps 340–350).

On the other hand, where the certificate or certificates has or have not been received by the provider, the latter checks the validity of the claim, that is to say the presence of the electronic signature. Furthermore he produces a new electronic signature which he transmits to the purse accompanied by a request for payment, that is to say a request for the certificate or certificates (step 320).

The purse records the characteristic data of the transaction in the EEPROM memory as well as the new electronic signature, replacing the previous one, and recalculates the certificates for the failed debit (step 330).

With the certificates received, recorded and checked, the provider acknowledges the payment (step 340). Finally, the purse erases the proof of the transaction (step 350).

With the claim procedure complete, the content of the purse is debited, the provider has collected the payment and may therefore render the corresponding service required by the user of the electronic purse.

The examples which have just been described make it possible to understand how management of the storing and erasing of the signature is different depending on the type of operation performed.

Thus, in the case of a credit, erasing of the signature and crediting of the content of the purse are carried out simultaneously.

On the other hand, in the case of a debit, it is recording of the signature and debiting of the content of the purse which are carried out simultaneously.

According to an alternative embodiment, the data transfer method according to the invention may also be applied to a transaction of value units between a gaming organisation and a chip card by means of a network.

In this case, the data transferred are value units each corresponding to a sum of money defined beforehand. Reloading of the content of the chip card is carried out by means of a bank internal to the gaming organisation. Furthermore, the content of the chip card is credited or debited depending on whether the user has won or lost a game. The transactions performed are therefore similar to the financial transactions which have just been described.

An electronic signature, intended to prove that a transaction has failed, can be used only once: the signature of a failed transaction is replaced by a new electronic claim transaction signature and, in all cases, the signature is erased when the transaction has succeeded.

What is claimed is:

1. Method for secure transfer of data by a communication network, between a first entity constituted by a chip card and a second entity, comprising first producing an electronic signature, the latter making it possible to prove an initiation of the transfer, and of storing the signature in at least one memory area of the chip card and then, when the data transfer is complete, of erasing this signature, said method including a claim procedure, this procedure comprising of checking the presence or absence of the electronic signature in a memory area of the chip card, in order to know whether the data transfer has failed or succeeded, characterised in that, when the data transfer has been interrupted, the claim procedure furthermore comprising:

producing a new electronic signature, replacing the signature of the failed transfer by said new signature, performing the steps of the transfer not yet executed, and then erasing the new signature when the transfer is complete.

2. Method according to claim 1, characterised in that the signature is stored securely in a memory area so that it is not accessible to the outside world either for reading nor writing.

3. Method according to claim 1, characterised in that the memory area of the chip card in which the signature is stored is an area of electrically programmable memory of EEPROM type.

4. Method according to claim 1, characterised in that the electronic signature is produced by a second entity and erased by the chip electronics.

5. Method according to claim 1, characterised in that the electronic signature is produced by means of a cryptographic algorithm.

6. Method according to claim 1, characterised in that the transferred data are value units.

7. Method according to claim 1, characterised in that the chip card is an electronic purse.

8. Application of the method according to claim 1 to a financial transaction between a banking institution and an electronic purse in order to credit the content of the latter, or between a service provider and an electronic purse in order to debit the content of the latter.

9. Application according to claim 8, characterised in that where the content of the purse is credited, the credit operation and erasing of the signature are carried out simultaneously.

10. Application according to claim 8, characterised in that where the content of the purse is debited, the storage of the signature in a memory area and the debit operation are carried out simultaneously.

11. Application of the method according to claim 1 to a value unit transaction between a gaming organisation and a chip card.

* * * * *